Patented Aug. 29, 1950

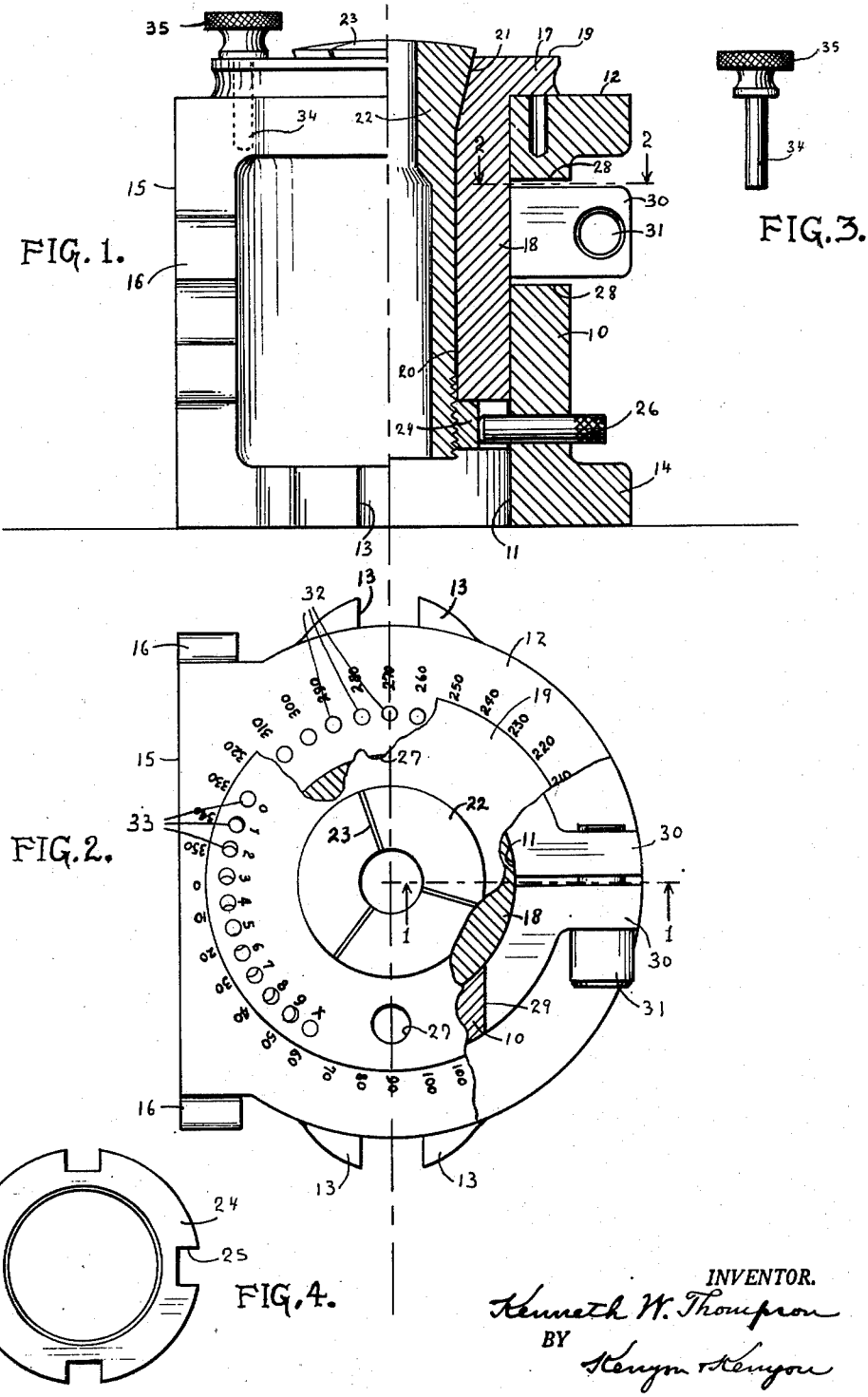

2,520,518

UNITED STATES PATENT OFFICE 2,520,518

WORK HOLDER

Kenneth W. Thompson, Franklin Square, N. Y.

Application August 22, 1946, Serial No. 692,333

5 Claims. (Cl. 90—57)

This invention relates to a work holder of the type that is adapted to hold a work piece firmly in position to be acted upon by a cutting or milling tool. This invention relates particularly to a work holder wherein the work piece is gripped by a collet and wherein means are provided for holding the collet in desired position in a suitable base member and for adjusting the position of the collet and the work piece gripped thereby relatively to the base member of the work holder.

It is a purpose of this invention to provide a work holder that is simple, compact and economical to manufacture, which at the same time is so designed as to permit the ready and accurate adjustment of the position of a work piece within close limits of rotational adjustment relative to the base member of the work holder. The work holder of this invention is adapted not only for use on a milling machine, drill press or the like, but also for other uses, for example, in layout work.

The work holder of this invention comprises a suitable base member which may be in the form of a casting and which can be secured fixedly in position on the machine with which it is to be used. The base member has a cylindrical bore, and a collet holder sleeve has a peripherally cylindrical portion that fits within the cylindrical bore of the base member, there being sufficient clearance, however, so that the rotational position of the collet holder sleeve can be adjusted to any rotational position relative to the cylindrical bore of the collet holder sleeve. When the collet holder sleeve has been brought to the desired rotational position relative to the cylindrical bore of the base member, it can be releasably secured in such position by appropriate securing means so that the position of the collet holder sleeve and the collet and work piece held therein will remain firmly fixed in relation to the base member during a cutting or milling operation. The collet holder sleeve is centrally bored to receive the collet, the size of the collet that is employed depending upon the size of the work piece. Means are also provided for releasably clamping the collet in the collet holder sleeve so as to clamp a work piece firmly in place in the collet and at the same time fix the position of the collet in the collet holder sleeve.

A principal feature of this invention relates to the novel means of my invention whereby the collet holder sleeve (and the collet and work piece held therein) may be readily and accurately selectively positioned relatively to the base member of the work holder. To this end, I provide a series of holes in the base member having their mouths in the peripheral surface of the base member, which mouths are of equal angular spacing from each other and are equally spaced from the longitudinal axis of the cylindrical bore of the base member in a plane that is normal to said axis. I also provide in a part that is integral with the collet holder sleeve and that overlies the peripheral surface in which the mouths of the holes in the base member occur a series of holes extending therethrough, each of which is disposed for becoming selectively positioned in alignment with any one of the holes in the series of holes in the base member. The holes of the series of holes in the part that is integral with the collet holder sleeve are of equal angular spacing about the longitudinal axis of the sleeve member, such angular spacing differing, however, from the most closely corresponding angular spacing of a plurality of the holes in the series of holes in the base member by a predetermined unit of angular rotation which is one of a plurality of equal angular portions of the angular spacing between adjacent holes in the series of holes in the base member. The number of holes in the series of holes in the part that is integral with the collet holder sleeve is at least equal to the number of the aforesaid units of angular rotation contained in the angular spacing between adjacent holes of the series of holes in the base member. A pin is provided that is adapted for passage through any of the holes in the part that is integral with the collet holder sleeve for selective penetration into any of the holes in the series of holes in the base member to thereby fix selectively the rotational position of the collet holder sleeve about its longitudinal axis relative to the cylindrical bore of the base member. By this arrangement, positive indexing of the position of the collet holder sleeve relative to the base member is afforded. Thus the series of holes in the base member afford a primary adjustment at convenient and readily-ascertained intervals of, say, 10° of angular rotation about the axis of the cylindrical bore in the base member; and by appropriate selection of the particular hole that is in the part that is integral with the collet holding sleeve, indexing at fractional intervals of the distance of primary adjustment is afforded, e. g., intervals of 1°, ½° or the like, as may be desired, the indexing being effected in any case by the pin that assures and fixes selectively the registration of any selected hole in the part integral with the collet holder sleeve in reference to any selected hole in the base member. It is a further advantage of my novel indexing means that the difference in the spacing of the holes in the two series of holes serves to minimize the possibility of accidental error in indexing, for the holes in the part which are adjacent the particular desired hole in the part that is in registration with a hole in the base member are not in registration with the holes in the series of holes in the base member.

Other features of this invention relate to the means for fixing the position of the collet holder sleeve within the cylindrical bore of the base member and to the means for clamping a collet in the collet holder sleeve.

Further purposes, features and advantages of this invention will be apparent from the following description of a typical embodiment that is illustrative of my invention, in connection with the accompanying drawings, wherein Figure 1 is a side elevation of the work holder of my invention with the right-hand portion in section on the line 1—1 of Fig. 2;

Fig. 2 is a plan view of the work holder with a portion broken away to show a section on the line 2—2 of Fig. 1 and with a portion of the annular flange of the collet holder sleeve broken away to show more clearly the indexing holes in the surface of the base member underlying the annular flange, the indexing pin being removed;

Fig. 3 is an elevation of the indexing pin forming part of the work holder; and

Fig. 4 is a plan view of the collet clamping nut forming part of the work holder.

Referring to the accompanying drawings, the work holder illustrated therein comprises a base member 10 having the cylindrical bore 11. The base member may be in the form of a casting and may be of any suitable size and shape adapted for use with a cutting or milling machine. The base member is provided at one end thereof with the peripheral plane surface 12 which is normal to the longitudinal axis of the cylindrical bore 11 of the base member. For attachment of the work holder to a machine such as a drill press, milling machine or the like, the base member is provided with notched lugs 13 in the annular flange 14 at the lower end of the cylindrical bore 11 of the base member. The notches in these lugs may be of any suitable size and shape so as to accommodate bolts for securing the work holder in place. When the notched lugs 13 are used for this purpose, the cylindrical bore of the base member is disposed vertically. In order that the cylindrical bore of the base may be disposed horizontally in case it may be desirable to do so, the work holder is provided with a flat face 15 on one side thereof with notched lugs 16 at the opposite ends thereof to accommodate bolts for fixing the work holder in place. Any other means for securing the base member in any desired position to the machine with which the work holder is used can, of course, be employed.

The collet holder sleeve, which is indicated generally by the reference character 17, comprises a peripherally cylindrical portion 18 which is adapted to fit within the cylindrical bore 11 of the base member with a close clearance which is sufficient, however, to permit manual rotation of the collet holder sleeve about its longitudinal axis within the cylindrical bore of the base member. The collet holder sleeve at one end thereof includes the annular flange 19 which overlies the plane surface 12 of the base member. The collet holder sleeve has a central bore 20 which includes a tapered portion 21 at the outer end thereof. Within the collet holder sleeve is a collet 22 which is of conventional design and which includes the cuts 23 in the flared end thereof to provide a plurality of clamping fingers. To tighten the collet in the sleeve, the nut 24 is provided which is in threaded engagement with the threaded portion of the collet that extends beyond the inner end of the collet holder sleeve. It is apparent, that by tightening the nut against the lower end of the collet holder sleeve, the flared end of the collet can be drawn into the bore of the collet holder sleeve so as to contract the spacing of the clamping fingers of the collet and thereby firmly grip the workpiece that is held in the collet. In order that the collet may be clamped in position in the collet holder sleeve without removing the collet holder sleeve from the base member, the nut 24 is provided with the notches 25 within which the slidable pin 26 may be inserted. The pin 26 passes through the side wall of the base member and is longitudinally slidable so that it can be withdrawn or inserted manually. In the annular flange at the outer end of the collet holder sleeve, means is provided whereby the collet holder sleeve may be gripped so as to turn the collet holder sleeve relatively to the base member. In the embodiment shown, a pair of holes 27 is provided for co-operation with a spanner wrench. When the collet holder sleeve is rotated as by using a spanner wrench, the frictional contact between the collet and the collet holder sleeve causes the collet to rotate therewith, and it is apparent that, if the nut 24 is prevented from rotating by the pin 26, the collet can be clamped in position without removing the collet holder sleeve from the base member. By turning the collet holder sleeve in the opposite direction, the clamping action of the nut 24 can be released.

The particular collet that is used in the work holder can, of course, be selected, depending upon the size of the workpiece, and for a single collet holder sleeve, a wide variation in the size of the collet employed is possible. Of course, by varying the over-all dimensions of the work holder as a unit or by varying the dimensions of the collet holder sleeve, the work holder of this invention can be made available for holding workpieces of any desired size. Moreover, the work holder of my invention may be used for holding a chuck or face plate in place of a collet.

The collet holder sleeve 17, either alone or with the collet clamped therein, may be rotated within the cylindrical bore of the base member, as mentioned above. This may be done manually, and when the collet holder sleeve is thus rotated, the pin 26 will, of course, be retracted so as not to engage the notches 25 in the nut 24. However, means is provided for clamping the collet holder sleeve within the cylindrical bore of the base member so that it may be fixed in any position of rotation relatively to the base member. It is preferable, according to my invention, to accomplish this result by the means which is shown in the drawings. The base member has two slots 28 therein which are normal to the longitudinal axis of the bore 11. These notches may be carried into the base member to any suitable extent, the inward extremity 29 of these notches, as shown in Fig. 2, merely being illustrative. These notches provide flexible members which can be drawn together as by the provision of the ears 30 which are apertured to accommodate the bolt 31. By tightening the bolt 31, the ears 30 and the flexible members on which they are carried can be drawn together so as to clamp the peripherally cylindrical portion of the collet holder sleeve in frictional engagement with the inner surface of the cylindrical bore of the base member. Upon releasing the bolt 31, the resiliency of the metal causes the ears 30 to assume their original position so that the collet holder sleeve can be manually turned in the base member.

In the plane surface 12 of the base member, a series of holes 32 is provided. These holes are disposed at an equal radial distance from the longitudinal axis of the bore of the base member and are disposed so as to be spaced from each other by equal angular spacing. By equal angular spacing, it is intended that the centers of the holes are disposed at an equal angle of rotation about the longitudinal axis of the cylindrical bore of the base member. In the embodiment shown, the angular spacing of adjacent holes in the series of holes 32 is 10°. While only some of these holes are shown in the drawings, it is to be understood that there is a total of 36 holes in the series, the entire series occupying 360° of angular rotation about the longitudinal axis of the cylindrical bore of the base member.

In the annular flange 19 of the collet holder sleeve, there are holes 33 extending therethrough, the holes 33 being arranged in a series with the angular spacing between each of the adjacent holes in the series equal. Since the collet holder sleeve is positioned coaxially within the cylindrical bore of the base member and since the holes 33 are positioned at the same radial distance as the holes 32 from the common longitudinal axes of the cylindrical bore of the base member and the peripherally cylindrical portion of the collet holder sleeve, it is apparent that any of the holes 33 may be selectively brought into registration with any of the holes 32 in the base member.

As mentioned above, the angular spacing of the holes 33 differs from the angular spacing of the holes 32 by a unit of angular rotation which is one of a plurality of equal fractional portions of the angular spacing between adjacent holes in the series of holes 32. In the particular embodiment shown, this unit is 1° and the angular spacing between successive holes 33 is 9°. The number of holes 33 in this series of holes is at least equal to the number of the above-mentioned units of angular rotation that are contained in the angular spacing between successive holes 33. Since this unit is 1° and since the angular spacing of the holes 32 is 10°, there should be at least ten holes 33 in this series of holes. For convenience, an eleventh hole 33 also has been provided in the particular embodiment shown. The eleven holes 33 in this series occupy the same angular distance as ten of the holes 32 in the base member. When the parts are in the position shown in Fig. 2, the hole 33 with the figure "0" adjacent thereto is in registration with the hole 32 opposite which are the figures "330." The holes 33 opposite which the numbers 1 to 9, respectively, appear are seen to be out of registration with underlying holes 32 in the base member. The hole 33 which is at the opposite end of the series and which is marked "X" is, however, in registration with the hole in the base member opposite which the figure "60" appears. Of course, by rotation of the collet holder sleeve 17 relatively to the base member, the series of holes 33 can be brought into any other position relatively to the series of holes 32.

In order to hold the collet holder sleeve in accurate position with any desired hole 33 in alignment with any desired hole 32 in the base member, an indexing pin 34 is provided having a head portion 35 which can be grasped manually for inserting and removing the pin. In Fig. 1, the pin 34 is shown in position so as to fix and maintain the hole 33 opposite which the figure "0" appears in alignment with the hole 32 opposite which the figure "330" appears.

The utility and advantages of the work holder of my invention may be illustrated by a typical example. By way of illustration, the work holder may be used for the purpose of milling five sides on a metal workpiece which, prior to milling, is in the form of a cylindrical rod. The workpiece is first put in place by removing the collet holder sleeve 17 from the base member 10. A collet 22 is selected so as to fit the particular workpiece in hand, and the end of the workpiece is slipped into the collet. The collet is then inserted in the central bore of the collet holder sleeve and the nut 24 is screwed handtight onto the inner end of the collet. The collet holder sleeve with the collet and workpiece therein is then inserted into the cylindrical bore of the base member 10 which has been set up on the table of the milling machine to be used. The base member can be positioned vertically as shown in Fig. 1 or can be positioned on its side as may be desired. The pin 26 is then pushed manually into one of the notches 25 in the nut 24 so as to hold the nut in position, and a spanner wrench is inserted into the two holes 27 in the exposed face of the collet holder sleeve. Using the spanner wrench, the collet holder sleeve, together with the collet and workpiece, can be rotated so as to tighten the nut 24 and thereby firmly hold the collet and the workpiece in place. The pin 26 is then disengaged from the nut 24, allowing the collet holder sleeve freedom to turn. The pin 34 is then inserted through the hole 33 opposite which the figure "0" appears and so as to penetrate the hole 32 in the base member opposite which the figure "0" appears, thereby lining up the two "0" holes. The bolt 31 is then tightened so as to hold the collet holder sleeve firmly in the casting. A milling cut is then taken on the workpiece, leaving the pin 34 in place or taking it out if it interferes with the milling. For the second cut, the bolt 31 is released and the collet holder sleeve is turned so that the hole 33 opposite which the figure "0" appears is a little beyond the hole 32 opposite which the figure "70" appears, and the pin 34 is inserted in the hole 33 opposite which the figure "2" appears. The pin 34 is also caused to penetrate into the hole 32 in the base member which underlies the hole 33 opposite which the figure "2" appears and which is the hole 32 opposite which the figure "90" appears so as to align the collet holder sleeve and the base member in this relative position, the parts being manually adjusted, if necessary, by slight relative movements thereof until the penetration of the pin into the hole 32 indicates the correct setting. Since the holes 33 are spaced only 9° apart, it is apparent that, when the pin is in the position last mentioned, the angular distance from this position to the position at which the original cut was taken on the workpiece will be 70° plus 2°, namely, 72°, which is the number of degrees necessary for providing a five-sided figure (⅕ of 360 equals 72°). The bolt 31 is again tightened and another cut taken on the workpiece. The above-described operations can then be repeated so as to locate the workpiece in position at 72° intervals for milling the remaining three sides of the desired five-sided figure.

It is apparent from the foregoing that I have provided a work holder which is simple in construction and which is of particular advantage because of the ease and accuracy with which the setting of the work piece in desired position may be accomplished. Moreover, settings within close limits of angular rotation can be afforded notwithstanding the employment of a relatively small number of indexing holes and notwithstanding simple and inexpensive construction of the unit.

While a particular embodiment of this invention has been shown in the drawings and described hereinabove, it is to be understood that this has been done merely for illustrative purposes and that the particular embodiment shown and described may be varied without departing from the scope of my invention. Thus, in addition to the series of holes 33 wherein the angular spacing of successive holes is 9°, a second series of twenty or more holes can also be provided in the annular flange 19 wherein the angular spacing between adjacent holes is 9.5°, thereby permitting settings at ½° intervals. A similar result could also be obtained by providing angular spacing of 5° between successive holes 32 and by providing a series of ten or more holes in the annular flange wherein the angular spacing between successive holes is 4.5°. Generally, it is preferable that the angular spacing between the successive holes 32 in the base member be of the order of 5° to 20°, so that these primary units of adjustment are readily apparent while at the same time these primary units are not of such great angular spacing as to require an excessive number of holes in the collet holder sleeve for accomplishing more exact positioning of the collet holder sleeve. Moreover, it is usually preferable that the angular spacing between adjacent holes of the series of holes in the part integral with the collet holder sleeve differ from the most closely corresponding angular spacing of a plurality of adjacent holes of the series of holes in the base member by not more than 2°, so that close adjustments and indexing of the collet holder sleeve relatively to the base member may be afforded. Somewhat more generally, it is the difference in the angular spacing of the holes in the collet holder sleeve as compared with the angular spacing of the most closely corresponding angular spacing of a plurality of adjacent holes in the series of holes in the base member which is important, the angular spacing of the holes in the collet holder sleeve differing from the spacing between the most closely corresponding spacing of a plurality of adjacent holes in the series of holes in the base member by a predetermined unit of angular rotation which is one of a plurality of equal fractional portions of the angular spacing between adjacent holes in the series of holes in the base member. Thus, in the embodiment shown in the drawings, settings at intervals of 1° of angular rotation are afforded by locating the holes 32 at 10° of angular spacing and by locating the holes 33 at 9° of angular spacing. However, it is apparent that a similar result is also obtained when the angular spacing between the successive holes 33 is 19° instead of 9°. Moreover, while it is usually preferable that the angular spacing between the holes in the collet holder sleeve be less than the angular spacing between the most closely corresponding spacing of a plurality of successive holes in the base member, it is apparent that the spacing between the holes in the collet holder sleeve could be greater by the unit difference above mentioned. Thus, in connection with the particular embodiment shown in the drawings, whereby settings at successive positions at intervals of 1° are provided, it is apparent that a similar result could be obtained by locating the holes 33 so that the angular spacing between them would be 11° or 21°.

In addition to the above, it is also apparent that other variations in the specific illustrative embodiment of the work holder of my invention may be made. Thus the location of the peripheral surface of the base member wherein the holes in the base member occur may be varied, and this applies as well to the part which is integral with the collet holder sleeve and through which holes are provided for registration with the holes in the base member. Moreover, it is apparent that the indexing holes may not only be round, but also may be of any other desired shape such as square, hexagonal, etc., so long as the hole contours and the contour of the indexing pin are such as to insure accurate selective alignment of the holes in the collet holder member with the holes in the base member. More generally, the practice of this invention, as described and illustrated hereinabove, may be varied within the scope thereof as determined by the language of the following claims.

I claim:

1. A work holder comprising a base member having a cylindrical bore, a collet holder sleeve member which has a peripherally cylindrical portion adapted to fit coaxially within said cylindrical bore of said base member for rotatable adjustment of its position therein and which is centrally bored for holding a collet, means for releasably securing said sleeve member fixedly in any position of angular rotation of said sleeve member relative to the said cylindrical bore of said base member, a series of holes in said base member having mouths in peripheral surface of said base member which are of equal angular spacing from each other and are equally spaced from the longitudinal axis of said cylindrical bore of said base member in a plane that is normal to said axis, a part integral with said sleeve member which part overlies the peripheral surface of said base member in which said mouths of said holes in said base member occur, a series of holes through said part each of which is disposed for becoming selectively positioned in alignment with any one of said holes in said base member depending on the angular position of said sleeve member relative to said cylindrical bore of said base member, and a pin adapted for passage through any of said holes in said part for selective penetration into any of said holes in said base member to thereby fix selectively the rotational position of said sleeve member about its longitudinal axis relative to said cylindrical bore of said base member, the holes constituting said series of holes in said part being of equal angular spacing about the longitudinal axis of said sleeve member that differs from the most closely corresponding angular spacing of a plurality of adjacent holes in the series of holes in said base member by a predetermined unit of angular rotation which is one of a plurality of equal fractional portions of the angular spacing between adjacent holes in said series of holes in said base member, and the number of holes in said series of holes in said part being at least equal to the number of said units contained in the angular spacing between adjacent holes of said series of holes in said base member.

2. A work holder according to claim 1 wherein said series of holes in said base member extend throughout 360° of angular rotation about the axis of said cylindrical bore in said base member, and wherein the angular spacing between successive holes in said series of holes in said base member is of the order of 5° to 20°.

3. A work holder according to claim 1, wherein said means for releasably securing said collet holder sleeve member fixedly in any position of angular rotation of said sleeve member relative to said cylindrical bore of said base member comprises a split portion of the wall that presents said cylindrical bore of said base member and means for releasably contracting said split portion of said wall for frictional engagement with said peripherally cylindrical portion of said collet holder sleeve member.

4. A work holder comprising a base member having a cylindrical bore and a plane surface adjacent one end of and normal to said cylindrical bore, a collet holder sleeve member which has a peripherally cylindrical portion adapted to fit coaxially within said cylindrical bore of said base member for rotatable adjustment of its position therein, which is centrally bored for holding a collet and which has an annular flange at one end thereof that overlies said plane surface of said base member, means for releasably securing said sleeve member fixedly in any position of angular rotation of said sleeve member relative to said cylindrical bore of said base member, a series of holes in said plane surface of said base member which are disposed at an equal radial distance from the longitudinal axis of said cylindrical bore of said base member and are of equal angular spacing throughout 360°, a series of holes through said annular flange of said sleeve member, each of which is disposed for becoming selectively positioned in alignment with any one of said holes in said plane surface of said base member, depending on the angular position of said sleeve member relative to said cylindrical bore of said base member, and a pin adapted for passage through any of said holes in said annular flange for selective penetration into any of said holes in said plane surface of said base member to thereby fix selectively the rotational position of said sleeve member about its longitudinal axis relative to said cylindrical bore of said base member, the holes constituting said series of holes in said annular flange of said sleeve member being of equal angular spacing about the longitudinal axis of said sleeve member, which angular spacing differs from the most closely corresponding angular spacing of a plurality of adjacent holes of said series of holes in said plane surface of said base member by a predetermined unit of angular rotation which is one of a plurality of equal fractional portions of the angular spacing between adjacent holes in said series of holes in said plane surface of said base member, and the number of holes in said series of holes in said annular flange of said sleeve member being at least equal to the number of said fractional units contained in the angular spacing between adjacent holes of said series of holes in said plane surface of said base member.

5. A work holder according to claim 4 wherein the angular spacing between adjacent holes of said series of holes in said plane surface of said base member is of the order of 5° to 20° and wherein the angular spacing between adjacent holes of said series of holes in said annular flange of said sleeve member differs from the most closely corresponding angular spacing of a plurality of adjacent holes of said series of holes in said base member by not more than 2°

KENNETH W. THOMPSON.

REFERENCES CITED

The following references are of record in the file of this patent:

UNITED STATES PATENTS

| Number | Name | Date |
| --- | --- | --- |
| 525,050 | Kempsmith | Aug. 28, 1894 |
| 1,260,130 | Bemis | Mar. 19, 1918 |
| 1,273,417 | Smith | July 23, 1918 |
| 1,461,316 | La Casse | July 10, 1923 |
| 2,186,236 | Dearborn | Jan. 8, 1940 |
| 2,335,721 | Zagar | Nov. 30, 1943 |
| 2,341,099 | Hellman | Feb. 8, 1944 |